Patented Jan. 30, 1923.

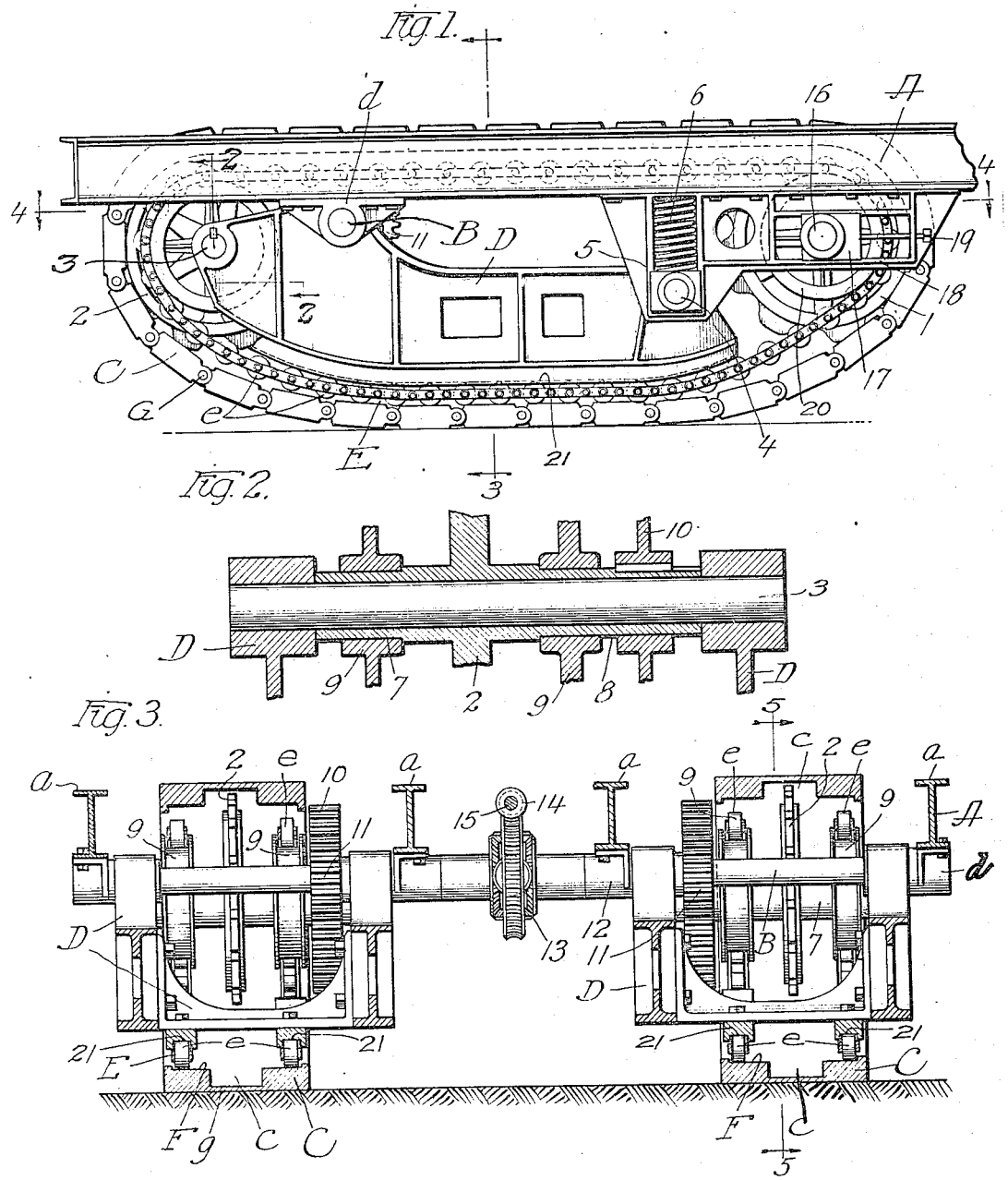

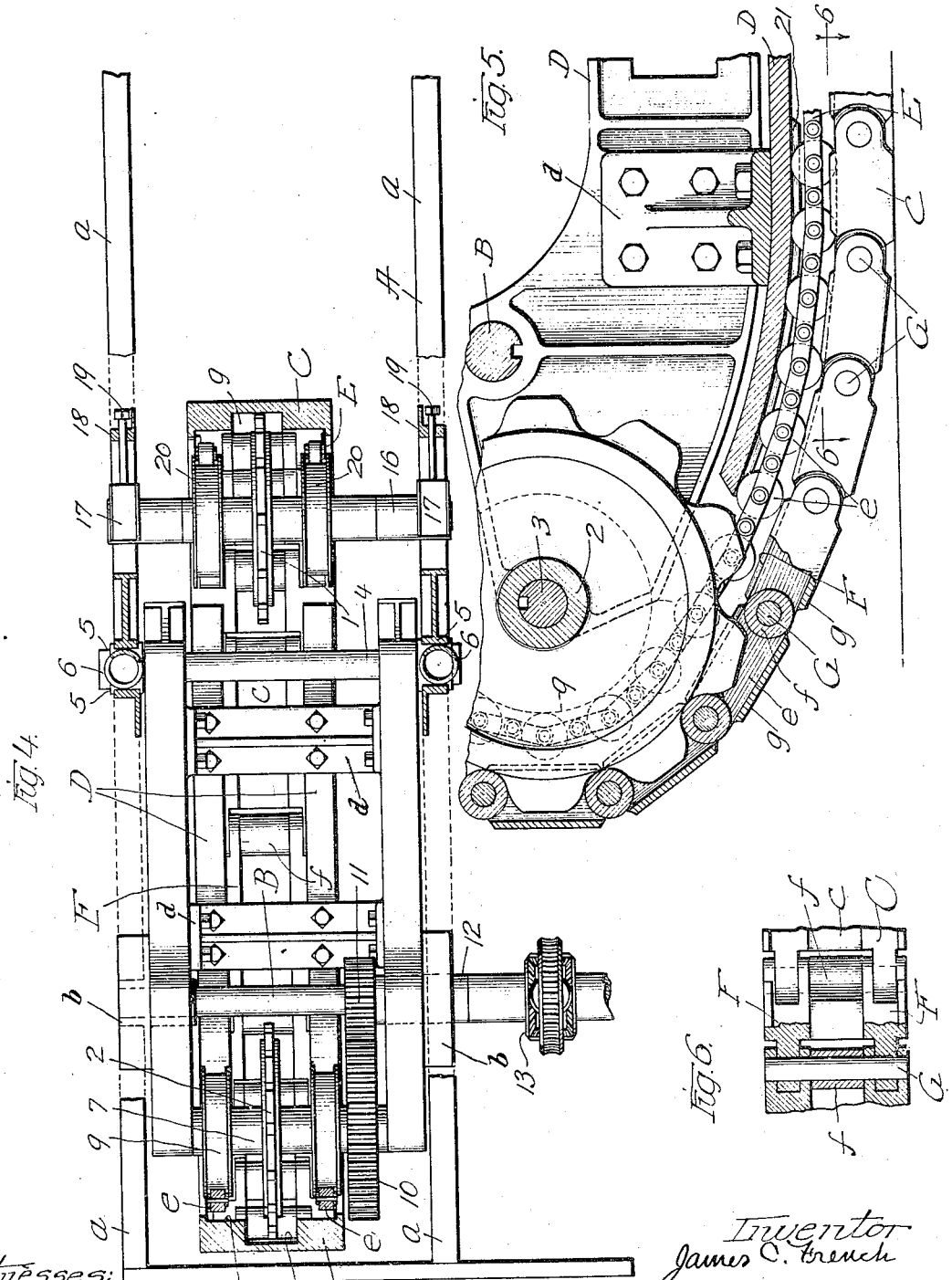

1,443,787

UNITED STATES PATENT OFFICE.

JAMES C. FRENCH, OF CHICAGO, ILLINOIS, ASSIGNOR, BY MESNE ASSIGNMENTS, TO F. C. AUSTIN MACHINERY COMPANY, A CORPORATION OF ILLINOIS.

MULTIPEDAL TRACTOR.

Application filed December 10, 1917. Serial No. 206,362.

*To all whom it may concern:*

Be it known that I, JAMES C. FRENCH, a citizen of the United States of America, and resident of Chicago, county of Cook, and State of Illinois, have invented a certain new and useful Improvement in Multipedal Tractors, of which the following is a specification.

This invention relates to traction devices of that kind in which the load is imposed on the endless belt or tread through the medium of a tilting frame or member which bears upon the upper surface of the lower portion of the belt, and in which anti-friction means are interposed between the said belt and said tilting frame or member, so that friction is reduced.

Generally stated, the object of the invention is to provide a novel and improved traction device of the foregoing general character.

A special object is to provide an improved construction and arrangement whereby the belt is yieldingly presented to the surface of the ground, through the medium of spring means interposed between the tilting frame or member and the body frame or chassis of the tractor or the truck or other vehicle upon which the traction device is employed, and whereby the means for operating the belt is supported directly on said tilting frame or member and gear-connected with power-transmitting mechanism mounted on the horizontal transverse axis about which said frame or member tilts up and down at its forward end.

Another object is to provide an improved construction and arrangement whereby the use of certain features of construction heretofore considered necessary or desirable is entirely obviated.

It is also an object to provide certain details and features of construction and combinations tending to increase the general efficiency and desirability of a traction device of this particular construction.

To the foregoing and other useful ends, the invention consists in matters hereinafter set forth and claimed.

In the accompanying drawings:—

Figure 1 is a side elevation of the rear end portion of a truck or other vehicle provided with a traction device embodying the principles of the invention.

Figure 2 is an enlarged detail section on line 2—2 in Figure 1.

Figure 3 is a vertical section on line 3—3 in Fig. 1.

Figure 4 is a horizontal section on line 4—4 in Figure 1.

Figure 5 is an enlarged detail section on line 5—5 in Figure 3.

Figure 6 is a detail section on line 6—6 in Fig. 5.

As thus illustrated, the invention comprises a body frame or chassis A of any suitable form or character, having its rear end portion provided with a transverse stationary axle B supported against rotation in the brackets $d$ suitably secured to the under-side of said chassis. Each side of said frame or chassis is preferably provided with parallel members $a$ which are spaced apart to provide spaces for the two traction devices which take the place of the rear wheels ordinarily employed on a truck or other vehicle of this general character. Each traction device comprises an endless belt or tread C supported on front and rear sprocket wheels 1 and 2, which latter are of any suitable character and arranged to engage the middle portion $c$ of the belt. Each traction device has a pair of tilting frames or members D which are spaced apart and pivotally mounted on the axle B, and which are rigidly held in their spaced relation by the rear spindle 3 which is keyed or otherwise suitably secured to the rear ends of said shoes to provide a horizontal axis of rotation for the sprocket wheel 2. The front ends of said tilting members D, which serve as shoes to impose the weight of the load on the traction device, are connected by the transverse member 4 having its opposite ends mounted to slide up and down in the guides 5, which latter are of any suitable character and secured to the underside of the chassis or body frame of the vehicle. Springs 6 are interposed between the under-side of said chassis and the end portions of the transverse connecting member 4, so that the load is communicated to the shoes D through the medium of said springs.

A sprocket-wheel 2 is provided with hub extensions forming sleeves 7 and 8 upon which the wheels or sheaves 9 are loosely mounted, and in addition a gear-wheel 10 is keyed to the end of the sleeve 8 to rotate said sprocket wheel, and to thereby drive the belt. For this purpose, a pinion 11 is loosely mounted on the axle B and connected by a sleeve 12 with one side of the differential gearing 13, which latter is of any suitable character and driven by the worm 14 on the longitudinal shaft 15, the latter extending forward in any suitable or ordinary manner to the engine usually mounted at the front end of the chassis, similar to that of an ordinary automobile or truck. Thus the transverse axle B rigidly connects together the two sides of the frame or chassis, and serves as the horizontal axis for the shoes D of both traction devices, while the differential gearing 13 permits one traction device to run faster than the other, in a manner that will be readily understood. The sprocket wheel 1 is similarly mounted on the stationary transverse member 16 mounted in adjustable supports 17 on the guides 18, which latter have adjusting screws 19 by which to adjust the member 16 toward and away from the axle B, thereby to regulate the action of the belt. The sprocket wheel 1 is provided with hub extensions like those of the sprocket wheel 2, and these extensions are provided with wheels or sheaves 20, loosely mounted thereon, like the wheels or sheaves 9 previously decribed. The two parallel sprocket chains E are carried on the wheels or sheaves 9 and 20, these wheels or sheaves being grooved to prevent lateral displacement of the said sprocket chains, and each sprocket chain is provided with anti-friction rollers e which travel in grooves 21 on the bottoms of the shoes D, thereby to reduce friction. The rollers e travel along between the belt C and the shoes D, and the sprocket chains E are thus propelled by the traveling movement of the rollers, and the wheels or sheaves 9 and 20 are in turn rotated by said sprocket chains, so that rolling anti-friction means are provided between the belt or tread and the tilting frame or member through which the load is communicated from the chassis. In this way, the two sprocket chains E are independent of each other, so that one can travel faster than the other, if the conditions require, thus tending to reduce friction and straining of the parts. With this construction, there is practically no load weight communicated to the traction device from the chassis through the medium of the short axle or transverse axis member 16, the latter merely supporting the rotary means by which the belt and the sprocket chains are supported. The weight of the chassis is communicated through the springs 6 to the shoes D, and from the latter to the rollers e, and from the latter to the lower portion of the belt or tread C; and, of course, some weight is communicated from the chassis through the axle B to the shoes D, and from the latter through the anti-friction rollers to the belt; but, under ordinary circumstances, no weight is communicated through the transverse axis members 3 and 16, except, of course, when the tractor is traveling in deep mud, so that upward pressure is exerted against the front and rear ends of the traction device, or when the latter travels over an obstruction. The tractor in its entirety does not tilt about either the transverse member 3 or the transverse member 16, so that neither sprocket wheel axis is utilized for this purpose; for, as distinguished from this, the transverse axis member 3 moves up and down on the line of a circle struck from the transverse axis of tilting motion provided by the axle B; and, with the construction shown, the axis member 16 is carried by the chassis and is not connected with the shoes D, the latter tilting about the axle B upon which the driving or power-transmitting mechanism is mounted. In this way, the front ends of the shoes D can rise, against the pressure of the spring 6, when the traction devices travel over obstructions in a forward direction; or, in backing up, the rear ends of the shoes or tilting members D can rise, inasmuch as the transverse axis member 3 is some distance in rear of the axle B and is carried by the rear ends of the two parallel shoes or tilting members.

Each belt C can be of any suitable character. For example, it may be constructed as shown in Figure 6, in which case the belt comprises parallel outside links F which are spaced apart laterally by the rollers f on the transverse pins G, the latter forming the pivots of the link-belt thus provided. The links F at one side of the belt are connected with the links F at the other side by tread portions g, which close the spaces between the rollers f, it being understood that the teeth of the sprocket wheels 1 and 2 enter these spaces, so that the rollers f engage between the teeth, (see Figure 5) in a manner that will be readily understood. The rollers e travel on the smooth surfaces provided by the links F and the sprocket wheels 1 and 2 engage the apertured middle portion or recessed path formed on the inner surface of the belt, whereby the latter is driven by the positive rotation of the sprocket wheel 2, when power is communicated to the latter from the engine through the medium of the transmission gearing and the pinions 11 on the axle B and the gear-wheels 10 which are each rigid with one of the sprocket wheels 2 at the rear end of the vehicle.

With the foregoing construction, no revolvable shafts are necessary on the chassis or body frame, or on the tilting frame or member inside of each traction device; and, with the arrangement thus employed, whereby the two wheels or sheaves 9 are independent of each other, as are the wheels or sheaves 20, the two sprocket chains E are practically independent of each other and either one may travel faster or slower than the other. Of course, with the wheels or sheaves 9 and 20 mounted to rotate independently of each other, and independently of the sprocket wheels 1 and 2, there is less friction between these sprocket chains and said wheels or sheaves; for, it will be seen, the belt C necessarily travels faster than the sprocket chains E, whereby rigidity of the wheels or sheaves 9 and 20 with said sprocket wheels 1 and 2 is preferably omitted, so that the said wheels or sheaves can run slower than the sprocket wheels, and can be turned by their respective sprocket chains at whatever speed the sprocket chains are traveling at any time. Various other features of construction heretofore considered necessary and desirable are also avoided, and the construction is thereby rendered not only sufficiently flexible to enable the traction devices to accommodate themselves to uneven surfaces of the ground, in the desired manner, without undue friction or straining of the parts, but at the same time the construction is rendered strong and rigid, the two shoes of each traction device being held in alinement with each other transversely of the vehicle, as they are connected together at their rear ends by the transverse axis member 3 which is keyed or otherwise secured at the rear ends of said runners, whereby the latter always tilt up and down in unison. Other advantages will be obvious to those skilled in the art, and the invention is not, of course, limited to the exact construction shown and described.

From the foregoing it will be seen that the two side members D of the truck frame are rigidly connected together by the cylindric end members 3 and 4, as the latter are rigidly and non-rotatably fixed or held in the ends of the side members, whereby a very rigid truck frame is provided which tilts freely about the transverse axis provided by the axle B previously described. By thus holding the end members against rotation, the two side members of the truck frame are so rigidly connected together that they form a frame which is not subject to distortion or straining and loosening of the parts thereof when the tractor is in operation, and when the belt travels over rough or uneven ground. Also, by rigidly mounting the transverse cylindric member 16 on the chassis, so that it does not rotate, additional rigidity and strength are given the structure. Of course, as shown, the two side members of the truck frame are connected together by the transverse brackets "d" and the shoes D are bolted to these brackets, as shown in Figs. 4 and 5, so that this construction serves also to render the truck frame strong and rigid, the side members D being disposed farther apart than the shoes thereof which rest upon the anti-friction rollers e previously described.

What I claim as my invention is:

1. In a tractor, a body frame or chassis, a transverse axle on said frame, a tilting member on said axle, a sprocket wheel carried on the rear end of said member, a sprocket wheel supported upon the frame in front of said member, means on said axle for driving said rear sprocket wheel, a link-belt carried on said sprocket wheels to travel on the ground, spring means for yieldingly holding the front end of said tilting member down against the belt, and anti-friction means interposed between said tilting member and said belt.

2. A structure as specified in claim 1, said anti-friction means consisting of rollers, endless parallel chains upon which said rollers are carried, and wheels to support said chains, the wheels of one chain being mounted to rotate independently of the wheels of the other chain so that one chain can travel faster than the other.

3. A structure as specified in claim 1, said member comprising a plurality of parallel and longitudinally arranged shoes rigidly connected together by the axis of the rear sprocket wheel.

4. A structure as specified in claim 1, and means for supporting said axle against rotation.

5. A structure as specified in claim 1, said front and rear sprockets being provided with non-rotatable axles forming the axes of rotation for said wheels.

6. In a tractor, the combination of front and rear sprocket wheels, a traction belt carried on said wheels, a body frame, a shoe pivoted on said body frame to bear upon said belt, means to support one sprocket wheel on one end of said tilting shoe, and means to support the other sprocket wheel on the body frame, the two sprocket wheels and said shoe having three separate and transverse horizontal axes of movement, and means on the axis of the shoe to transmit driving power to one of said sprocket wheels.

7. In a tractor, the combination of a body frame or chassis, front and rear sprocket wheels, a traction belt supported on said sprocket wheels, a non-rotatable axle for the front sprocket wheel, a non-rotatable axle for the rear sprocket wheel, a movable shoe supporting one of said axles, means to support the other axle on the body frame, means to drive the rear sprocket-wheel and mechanism to yieldingly impose the load weight of said chassis upon the lower portion of said belt, so that said axles do not rotate and do not sustain any load weight.

8. A structure as specified in claim 7, said mechanism comprising said movable shoe, spring means between said shoe and the chassis, so that the shoe is yieldingly held down, anti-friction rollers interposed between said shoe and said belt, rotary members loosely mounted on said axles, and endless chains supported on said rotary members, said rollers being carried on said chains, so that both the belt and said chains are supported by and travel around axles which do not rotate.

9. In a tractor, the combination of a body frame, an axle, the axle being nearer one end of said frame than the other, supported in bearings on said body frame, a tilting member on said axle, an endless traction belt, anti-friction means in front and rear of said axle to support said member on the lower portion of said belt, means to support the forward portion of the belt on the body frame, means to support the rear portion of said belt on said member, means to yieldingly hold the forward end of said member against upward movement, and means on said axle to communicate driving power to the rear portion of said belt.

10. In a tractor, the combination of a chassis, an axle mounted in said chassis and held against rotation, a truck frame mounted to tilt on said axle, a spindle non-rotatably mounted in the rear end of said truck frame, an endless traction belt, means adapted to rotate on said spindle to support said belt, a second spindle non-rotatably mounted in the front end of said truck frame, and means mounted on said axle and said first-mentioned spindle to drive said belt.

11. In a tractor, the combination of a chassis, a truck frame, cylindric members inserted and held against rotation on the front and rear ends of said frame, an endless traction belt, means adapted to rotate on one of said members to support said belt, means to support the truck frame on the lower portion of the belt, means on the chassis and disposed through the truck frame to impose the load weight on said truck frame, and gearing adapted to rotate on said belt-supporting cylindric member to receive and transmit the power for driving said belt.

12. A structure as specified in claim 11, said means for imposing the load weight on the truck frame comprising a transverse axle, in combination with means on said axle to operate said gearing.

13. In a tractor, the combination of a chassis, parallel side members, transverse cylindric end members rigidly connecting the side members together to form a rigid truck frame, the two end members being held against rotation, an endless traction belt, means adapted to rotate on one of said end members to support said belt, means on said chassis and disposed through the truck frame for imposing the load weight on said truck frame, so that the truck frame is free to tilt about said means as a transverse axis, and means adapted to rotate on said belt supporting cylindric member to drive the traction belt.

14. A structure as specified in claim 13, in combination with means supported by one of said non-rotatable end members to support the truck frame on the lower portion of said traction belt.

15. A structure as specified in claim 13, said means for imposing the load weight on the truck frame comprising a transverse axle disposed between said non-rotatable end members and forming a transverse axis of tilting movement for the truck frame, together with springs to yieldingly hold the front end of the truck frame against upward movement.

16. A structure as specified in claim 13, in combination with a chassis or body frame having rotatable means thereon to support said traction belt, and springs on said chassis to yieldingly hold the front end of said truck frame against upward movement.

17. A structure as specified in claim 13, the side members of the truck frame being rigidly connected together by brackets, and shoes on said brackets to impose the load weight on the lower portion of said belt.

Signed by me at Chicago, Cook County, Illinois, this 24th day of November, 1917.

JAMES C. FRENCH.